(12) United States Patent
Grier

(10) Patent No.: US 9,818,093 B1
(45) Date of Patent: Nov. 14, 2017

(54) THIRD PARTY CHECK-IN ASSOCIATIONS WITH CLOUD WALLET

(75) Inventor: Benjamin D. Grier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 790 days.

(21) Appl. No.: 13/523,583

(22) Filed: Jun. 14, 2012

(51) Int. Cl.
*G06Q 40/00* (2012.01)
*G06Q 20/10* (2012.01)

(52) U.S. Cl.
CPC .................. *G06Q 20/102* (2013.01)

(58) Field of Classification Search
None
See application file for complete search history.

(56) References Cited

U.S. PATENT DOCUMENTS

| | | |
|---|---|---|
| 6,526,335 B1 | 2/2003 | Treyz et al. |
| 2001/0049636 A1 | 12/2001 | Hudda et al. |
| 2009/0265228 A1 | 10/2009 | Sterling et al. |
| 2010/0276484 A1* | 11/2010 | Banerjee ................ G06Q 30/06 235/379 |
| 2011/0238476 A1 | 9/2011 | Carr et al. |
| 2012/0101881 A1* | 4/2012 | Taylor .................... G06Q 20/12 705/14.13 |
| 2012/0123841 A1 | 5/2012 | Taveau et al. |
| 2012/0158545 A1 | 6/2012 | Chen et al. |
| 2012/0233073 A1 | 9/2012 | Salmon et al. |
| 2012/0239479 A1* | 9/2012 | Amaro ................ G06Q 20/102 705/14.23 |
| 2012/0271691 A1 | 10/2012 | Hammad et al. |
| 2012/0290421 A1 | 11/2012 | Qawami et al. |
| 2012/0303425 A1 | 11/2012 | Katzin et al. |
| 2013/0042314 A1* | 2/2013 | Kelley .................. H04L 9/3215 726/9 |
| 2013/0117832 A1 | 5/2013 | Gandhi et al. |
| 2014/0114815 A1* | 4/2014 | Dangott ................ G06Q 40/00 705/30 |
| 2014/0310113 A1* | 10/2014 | Sengupta et al. ............... 705/17 |
| 2014/0310114 A1* | 10/2014 | Fowler ............................ 705/20 |
| 2014/0337175 A1* | 11/2014 | Katzin ................ G06Q 20/204 705/26.62 |

FOREIGN PATENT DOCUMENTS

| | | | | |
|---|---|---|---|---|
| WO | WO 2011/139643 | * | 11/2011 | ........... G06Q 20/102 |
| WO | WO 2011/139643 A1 | * | 11/2011 | ............. G06Q 99/00 |

OTHER PUBLICATIONS

Office action for U.S. Appl. No. 13/523,663, dated Aug. 7, 2014, Grier, "Social-Network Implemented Check-In Associations With Cloud Wallet", 33 pages.

(Continued)

*Primary Examiner* — Olabode Akintola
(74) *Attorney, Agent, or Firm* — Lee & Hayes, PLLC

(57) ABSTRACT

A cloud wallet system may receive an indication from a third party system that a user has checked-in at a merchant. The cloud wallet system then determines whether the merchant has an account with the cloud wallet system so that a point-of-sale (POS) purchase can be processed via the user check-in. If the merchant has an account with the cloud wallet system, a user profile corresponding to the user is sent to the merchant and a point-of-sale transaction based on a third party user check-in may be processed by the merchant through the cloud wallet system.

16 Claims, 13 Drawing Sheets

(56) References Cited

OTHER PUBLICATIONS

"American Express Announces Serve(SM), the Next Generation Digital Payment Platform", News: Press Release from American Express, accessible from http://about.americanexpress.com/news/pr/2011/serve.aspx, obtained on Jun. 14, 2012, 3 pages.
"Square card reader", web page of https://squareup.com/square?gclid=CKSWoL7tpbACFUZeTAoduQMeWA, obtain on Jun. 14, 2012, 3 pages.
Final Office Action for U.S. Appl. No. 13/523,663, dated Feb. 3, 2015, Benjamin D. Grier, "Social-Network Implemented Check-In Associations With Cloud Wallet", 28 pages.
Office action for U.S. Appl. No. 13/523,663, dated Jun. 6, 2016, Grier, Social-Network Implemented Check-In Associations With Cloud Wallet, 37 pages.
Office action for U.S. Appl. No. 13/523,663, dated Dec. 1, 2015, Inventor #1, "Social-Network Implemented Check-In Associations With Cloud Wallet", 46 pages.

\* cited by examiner

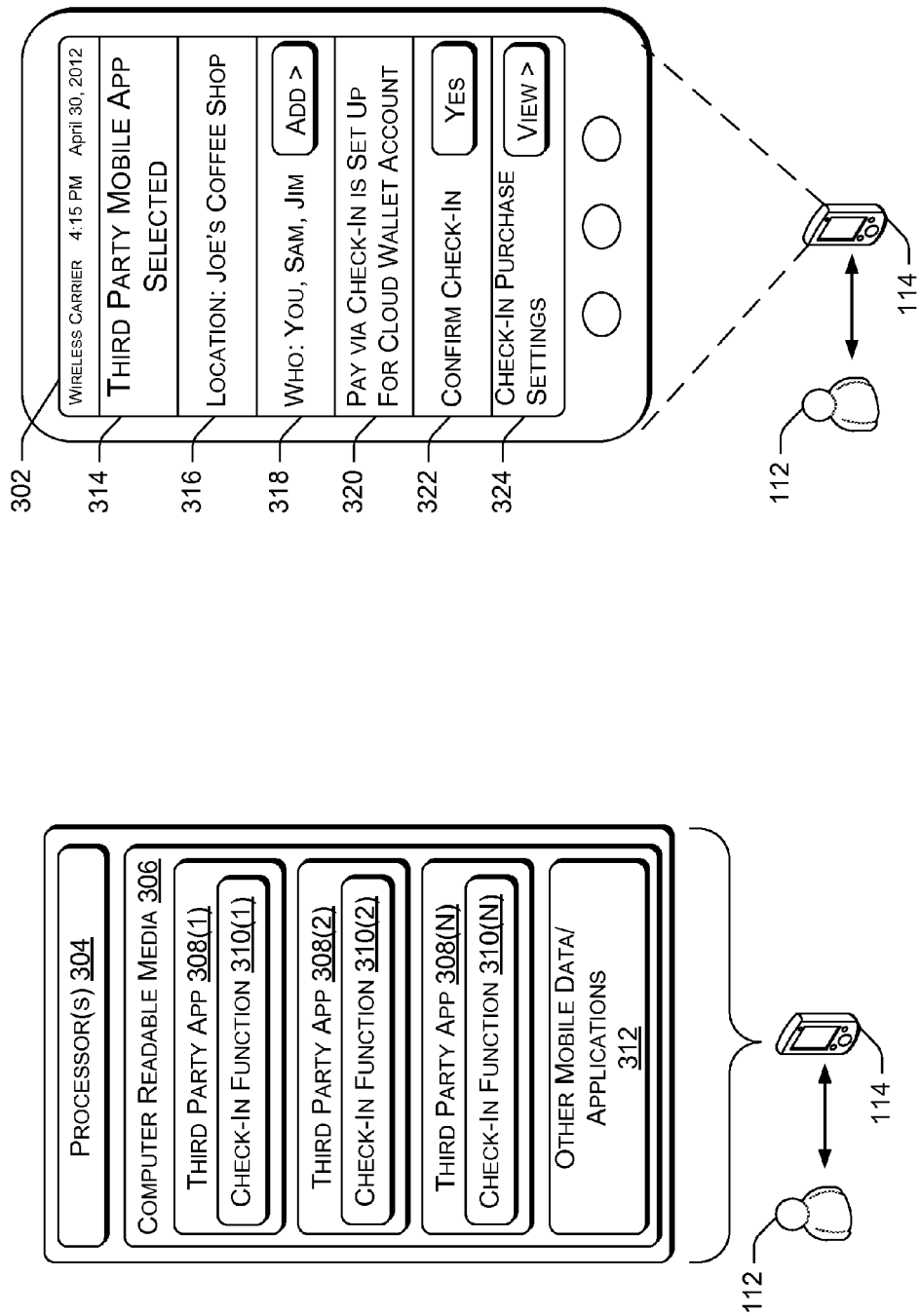

USER ACCOUNT 214(N)

ACCOUNT HOLDER NAME(S) 602

CONTACT INFO (ADDRESS, PHONE NUMBER(S), EMAIL(S)) 604

PAYMENT INFO (STORED VALUE ACCOUNT(S), CREDIT CARD(S), BANK ACCOUNT(S), GIFT CARD(S)) 606

THIRD PARTY CHECK-IN APPS USED 106(1-N)

USER PROFILE 608

PROFILE PHOTO(S) 610

THIRD PARTY CHECK-IN PURCHASE SETTINGS 216(N)

TIME DURATION FOR PURCHASE 612

MAXIMUM AMOUNT FOR SINGLE CHECK-IN 614

MAXIMUM AMOUNT FOR DEFINED TIME PERIOD 616

OTHERS ALLOWED TO CHECK USER IN 618

DAY OF THE WEEK RESTRICTIONS 620

DISCOUNTS/COUPONS 622

PUBLISH TO THIRD PARTY 624

NOTIFICATIONS 626

FIG. 6

THIRD PARTY CHECK-IN ASSOCIATIONS WITH CLOUD WALLET

BACKGROUND

Traditional methods for conducting point-of-sale financial transactions between a customer and a merchant commonly consist of an exchange of money using paper currency, checks, and payment cards (e.g., credit cards, debit cards, etc.). Recently, an increasing amount of financial transactions occur electronically by using electronic wallet services implemented in association with user mobile devices. An electronic wallet service is a centralized network entity that maintains user payment information and can process point-of-sale transactions between a merchant and a customer. Electronic wallet services allow a customer to pay for goods and services at a point-of-sale (POS) using their mobile devices.

One particular electronic wallet service has developed and implemented an application that allows a customer to check-in at a particular merchant through an electronic wallet. However, the electronic wallet and the developed check-in module are dedicated to one another, and thus, the developed check-in module can only be used in conjunction with the electronic wallet. This requires that the customer check-in using the developed check-in module in order to process a POS transaction using the electronic wallet.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

FIG. 3A is a block diagram of an example computing architecture of various components included in the user mobile device of FIG. 1.

FIG. 3B is a block diagram of an example graphical user interface for the user mobile device of FIG. 1.

FIG. 6 is a block diagram of example user account information in accordance with the techniques discussed herein.

DETAILED DESCRIPTION

Overview

Figure 1:
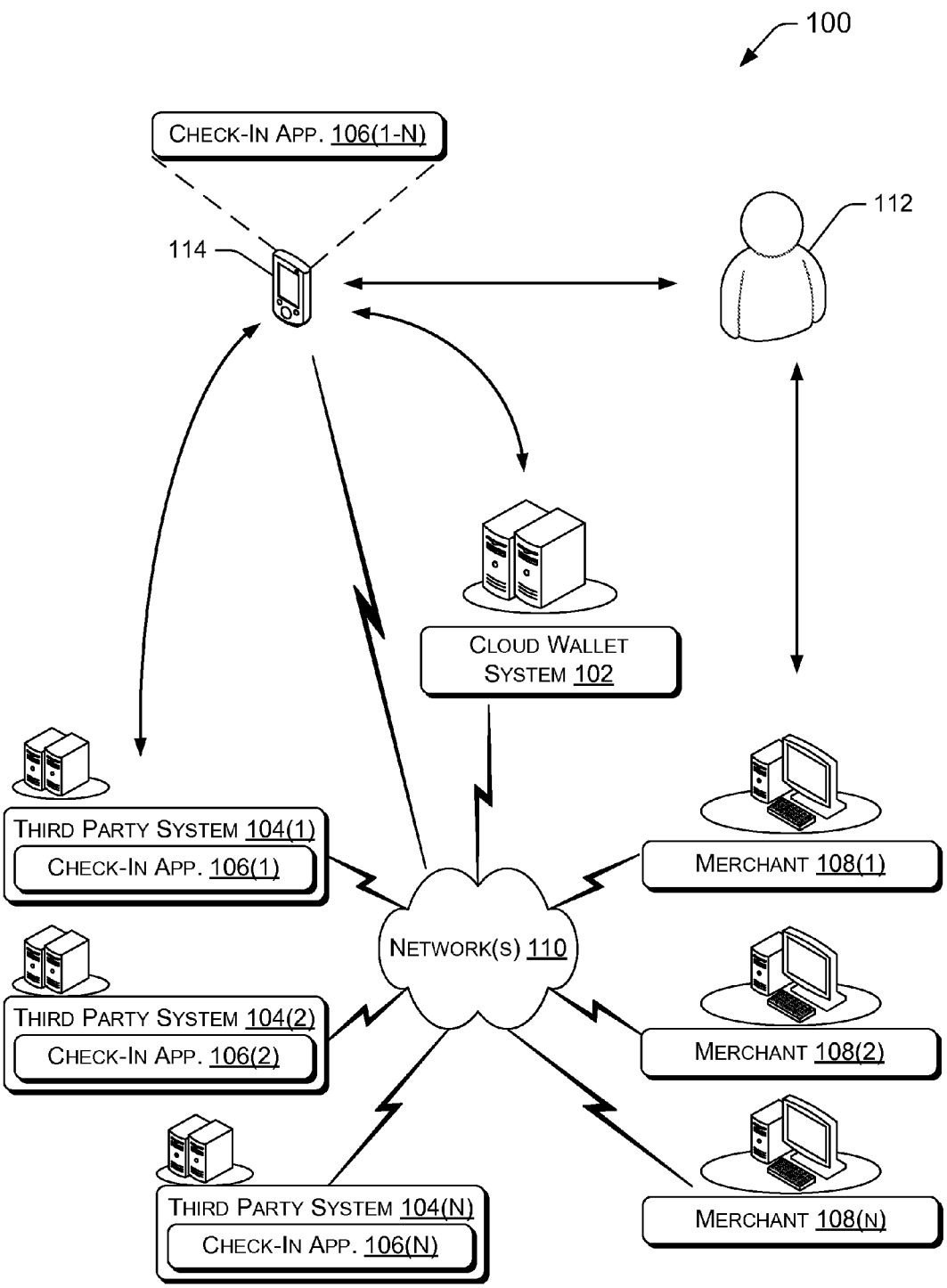
FIG. 1 is a schematic diagram of an example environment for point-of-sale transactions using third party check-in information and a cloud wallet system in accordance with the techniques discussed herein.

This disclosure is directed to techniques for processing point-of-sale (POS) transactions using one of multiple different third party check-in associations that are registered with a cloud wallet system. As discussed herein, the cloud wallet system is an independent system configured to interface with multiple different third party check-in applications. The cloud wallet system works with the third party check-in applications to process POS transactions between a merchant and a customer. In this sense, user convenience is realized because the customer can use any one of multiple different mobile check-in applications that are affiliated and registered with the cloud wallet system to assist in processing the POS transaction. For instance, the customer may prefer a particular check-in application based on social information sharing considerations (e.g., features, contacts, popularity, frequency of use, etc.) and not whether or not the check-in application is a dedicated check-in application (e.g., proprietary check-in application) for an electronic wallet service with which the customer is registered.

Accordingly, the independent cloud wallet system discussed herein eliminates the inconvenience of a user having to conduct a check-in at a merchant location using a non-preferred check-in application dedicated to the cloud wallet system. For example, a customer may typically share social information and physical location information via a preferred check-in application that is not associated with a cloud wallet system. However, to make a purchase or pay a bill at the merchant location, the customer would then need to perform a second check-in using a dedicated check-in application developed solely for the cloud wallet system with which the customer is registered.

In various embodiments, the third party systems discussed herein are independent social network systems (e.g., Facebook™, Twitter™, Foursquare™, etc.). Social network systems allow their users to create and form one or more networks and/or groups of approved contacts (e.g., family, friends, colleagues, professional connections, public contacts, private contacts, etc.). Social network systems further allow their users to share "social" information and happenings, either publicly or privately, with their created networks and/or groups via a social network feed and/or personal message board, for example. The shared social information may include, but is not limited to, personal status updates, recently read articles, recent games played, shared hyperlinks, contacts added, solicitations and location check-ins.

The independent cloud wallet system discussed herein provides a convenience to third party systems because the third party systems do not have to commit resources (e.g., infrastructure, money, time, etc.) to develop and implement a cloud wallet system to process POS transactions in association with customer check-ins.

In the context of this document, a "check-in" occurs when a user employs a mobile device application (or other suitable device or application) to share a physical location with one or more of the created social networks of contacts, for example. To share a physical location, the mobile device may be configured with Global Positioning System (GPS) functionality, or a user of the mobile device may manually specify and/or enter a particular location via a mobile check-in application provided by the third party system. The information may be wirelessly communicated over a network and conveyed to the user's contacts via a personal message board, news feed, a blog post, hash tag, etc. For example, a user may check-in at a concert venue to share that he/she is at a particular artist's concert. In another example, a user may check-in at an airport to share that he/she is traveling to a particular destination. In yet another example, a user may check-in at a particular merchant (e.g., restaurant, bar, retail store, coffee shop, car repair shop, etc.).

In the context of this document, a merchant is an entity that can conduct a POS transaction at a particular physical location visited by a customer. The physical location may be permanent (e.g., brick and mortar building) or may be temporary (e.g., mobile retail vehicle, taco truck, etc.). Accordingly, using a third party check-in application on a mobile device, a user can check-in at the current merchant location and this information will be shared via the third party system.

The techniques and systems described herein allow a customer to make a purchase at a particular merchant location using any one of various third party check-in applications. Various example implementations are provided below with reference to the following figures.

Illustrative Environment

FIG. 1 illustrates an example environment 100 where a user and a merchant perform a POS transaction via a third party check-in association. The environment may include a cloud wallet system 102, a number of third party systems 104(1) . . . 104(N) each with check-in functionality implemented via a check-in application 106(1) . . . 106(N) for use on mobile devices, and one or more different merchant systems 108(1) . . . 108(N) registered with the cloud wallet system 102 for third party check-in associations, each of which are further discussed herein.

In various embodiments, the cloud wallet system 102 (e.g., cloud register) connects users of the third party systems 104(1) . . . 104(N) with payment services so that POS transactions can be processed via the mobile check-in applications 106(1) . . . 106(N).

Each of the cloud wallet system 102, the third party systems 104(1) . . . 104(N), and the different merchant systems 108(1) . . . 108(N) may be communicatively connected via one or more networks 110. The networks 110 may include a local area network ("LAN"), a larger network such as a wide area network ("WAN"), a mobile telephone network (MTN), and/or a collection of networks, such as the Internet. Moreover, the networks 110 may be a wired network, a wireless network, or a combination of both.

The cloud wallet system 102 is an independent cloud wallet system that does not employ a unique, dedicated or integrated check-in application that each registered user must download and use to perform a POS purchase at a merchant. Rather, the independent cloud wallet system 102 interfaces with multiple different affiliated third party systems 104(1) . . . 104(N) so that POS transactions can be processed regardless of the mobile check-in application the user 112 (e.g., a customer) selects, or prefers, to use to check-in and share social information and/or physical location information. For instance, user 112 may prefer to frequently share physical location information via a first mobile check-in application. The first system may not have a dedicated cloud wallet system to process POS transactions, but instead may be registered and/or affiliated with the independent cloud wallet system 102. Thus, to process a POS transaction, the user 112 does not need to perform an additional check-in to the preferred first mobile check-in using a different mobile application that is dedicated to a cloud wallet system with which the user is registered.

Rather, user 112 may conveniently employ any one of the third party mobile check-in applications 106(1) . . . 106(N) on a mobile device 114 to both i) share social information and/or physical location information with respect to visiting merchant 108(N), and ii) conduct a POS transaction at the merchant 108(N). As discussed, above, the third party mobile check-in application may use automatic locating functionality (e.g., global positioning system (GPS), triangulation, internet protocol (IP) address mapping, etc.) to determine that the user 112 is physically located at, or within a vicinity of, the physical location of the merchant system 108(N) (e.g., the location of a retail store, within fifty feet of the retail store, etc.). In certain embodiments, the user 112 may specify his or her physical location independent of any automatic locating functionality (e.g., manually input textual information). Moreover, if the automatic locating functionality is used, the check-in may be an automatic check-in where the third party system 104(1) . . . 104(N) uses GPS tracking and/or GPS updates (or other technologies) to automatically recognize the user location upon the user's physical entrance at the merchant location, or within a defined vicinity of the merchant location. In certain embodiments, the automatic locating functionality check-in can be manually initiated by the user 112 by activating one of the third party check-in applications 106(1) . . . 106(N) to check-in using the automatic locating functionality.

Figure 2:
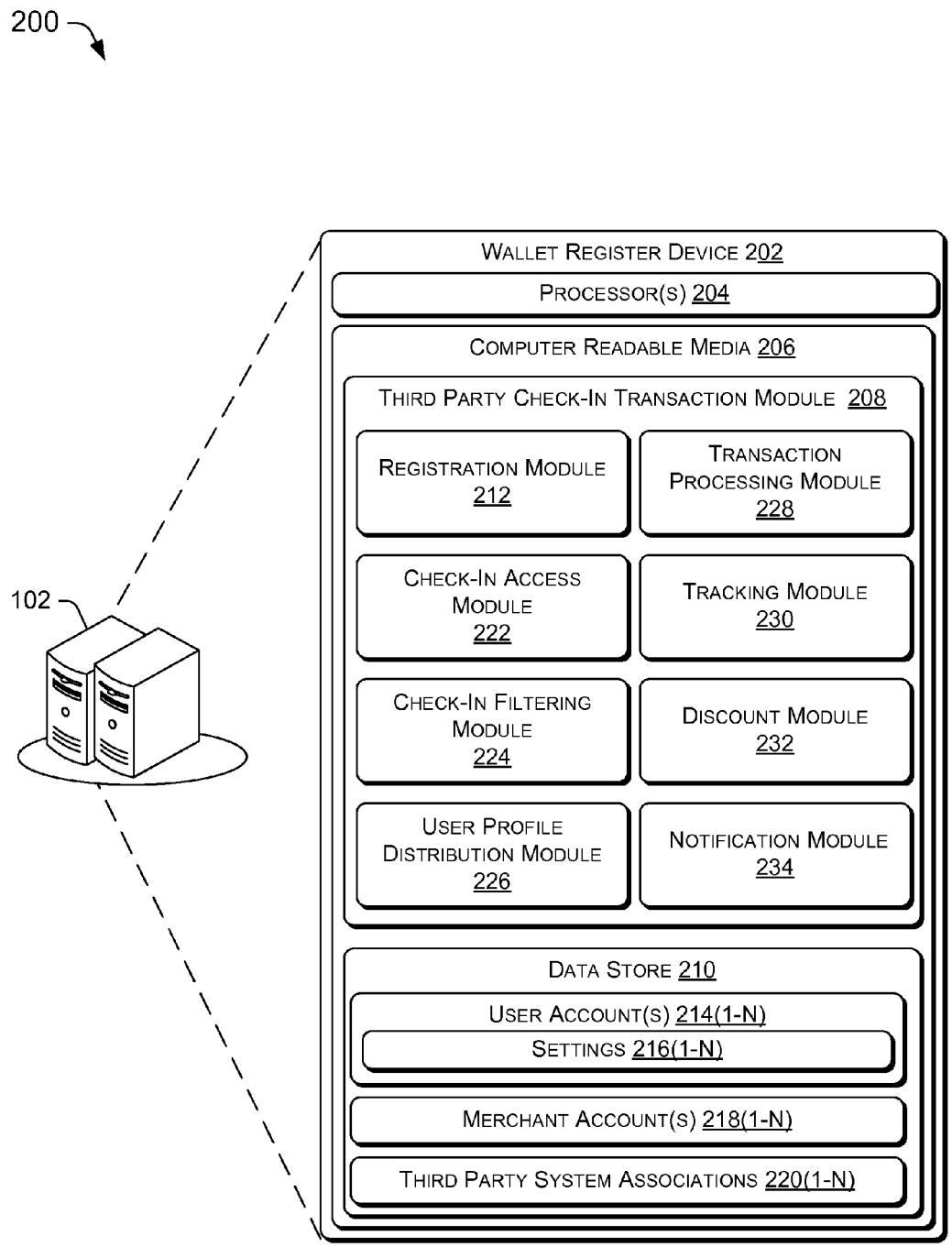
FIG. 2 is a block diagram of an example computing architecture of various components included in the example cloud wallet system of FIG. 1.

FIG. 2 illustrates an example computing architecture of various components included in the example cloud wallet system 102 of FIG. 1. The cloud wallet system 102 may include one or more wallet register devices 202 that host cloud wallet service functionality. A wallet register device 202 may be any one of an array of computing devices capable of storing, communicating, and processing personal data, check-in data, financial data and/or transactional data over the one or more networks 110. Such computing devices may be implemented in a distributed computing environment (e.g., cloud services, etc.) or in a non-distributed computing environment (e.g., a server farm, etc.).

Wallet register device 202 includes one or more processors 204 and computer readable media 206. The processors discussed in this document may be a single processing unit or a number of units, all of which could include multiple computing units. The processors 204 may be implemented as one or more microprocessors, microcomputers, microcontrollers, digital signal processors, central processing units, state machines, logic circuitries, shared memory processors, and/or any devices that manipulate signals based on operational instructions. Among other capabilities, the processors 204 may be configured to fetch and execute computer-readable instructions stored in the computer readable media 206.

Embodiments may be provided as a computer program product using the computer readable media 206, including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by downloaded through the Internet. With respect to FIG. 2, the computer readable media 206 may include a third party check-in transaction module 208 and a data store 210. The third party check-in transaction module 208 may include multiple different modules that facilitate the processing of a POS transaction between a customer (e.g., the user 112), via mobile device 114, and a merchant via a third party check-in. "Modules" may include instructions that, when executed by the processors 204, cause the processors 204 to perform operations described herein for a particular device.

In various embodiments, the third party check-in transaction module 208 includes a registration module 212. The wallet register device 202 employs the registration module 212 to connect different third party systems, different contacts of the third party systems (e.g., the user 112), and different merchants so that POS transactions can be conducted via a third party check-in association. Accordingly, the registration module 212 is configured to register users and store user accounts 214(1) . . . 214(N) for each registered user. The registered users employ one or more of the third party systems to share check-in information with their approved networks and/or created groups. Each user account 214(1) . . . 214(N) includes personal information and multiple settings 216(1) . . . 216(N), as further discussed herein.

In various embodiments, the registration module 212 is also configured to register different merchant accounts 218(1) . . . 218(N) that are willing to participate in POS transactions via third party check-in associations. In various embodiments, the merchant accounts 218(1) . . . 218(N) correspond to the merchants 108(1) . . . 108(N) that are affiliated with the independent cloud wallet system 102. As previously discussed, user convenience is realized by implementing the independent cloud wallet system 102 because POS transactions can be conducted via any one of multiple different third party check-in associations, and thus, merchants have an incentive to register with the cloud wallet system 102 so that additional efficient and convenient payment options become available to their customers.

In various embodiments, the registration module 212 is also configured to register multiple different third party system associations 220(1) . . . 220(N) so that the cloud wallet system 102 can access user check-in information at the third party systems. As previously discussed, these third party systems may be social networking systems, or any system that allows users to share "check-in" information.

In various embodiments, the third party check-in transaction module 208 includes a check-in access module 222 configured to access check-in information for different users of the different third party systems 104(1) . . . 104(N) associated with the cloud wallet system 102. For example, the check-in access module 222 may receive user check-in information from the different third party systems when the users of the third party systems use the mobile application to check-in at a particular location (e.g., the third party systems "push" user check-in notifications to the cloud wallet system 102). In other embodiments, the check-in access module 222 may be configured to monitor accessible information published at the third party systems (e.g., information posted and accessible via newsfeeds, personal feeds, personal message boards, event message boards, hash tags, etc.). In this scenario, the check-in access module 222 "pulls" user check-in information from the multiple different third party systems 104(1) . . . 104(N).

In various embodiments, the third party check-in transaction module 208 includes a check-in filtering module 224 that filters the accessed check-in information for multiple different users to determine whether i) the checked-in user has a registered account/profile 214(1) . . . 214(N) for processing POS transactions, and ii) the merchant that is the subject of a check-in location is also a registered merchant 218(1) . . . 218(N) for processing POS transactions. If both the checked-in user and the merchant associated with an accessed third party check-in are registered with the independent cloud wallet system 102, then POS transactions can be processed with the merchant. If either the user or the merchant are not registered, then the cloud wallet system 102 cannot process POS transactions with the merchant until a registration is completed.

In other embodiments, the filtering may occur at the third party systems prior to the third party systems pushing user check-in information to the cloud wallet system 102. For example, individual third party systems may only push user check-in notifications to the cloud wallet system for users that have a third party system profile indicating that the user is registered with the cloud wallet system 102 (e.g., as defined via account settings, membership settings, subscription settings, etc.).

In various embodiments, the third party check-in transaction module 208 includes a user profile distribution module 226 configured to identify and transmit a user profile to a particular merchant 108(N). The user profile and the particular merchant correspond to the user checking-in at a particular location as discussed with respect to FIG. 1.

In various embodiments, the third party check-in transaction module 208 includes a transaction processing module 228 configured to receive POS transaction data from the merchant, verify or confirm that the POS transaction can be processed in accordance with the user settings 216(1) . . . 216(N), and then causes the POS transaction to be processed. The POS transaction may be processed by debiting or charging the user account registered with the cloud wallet system 102. In certain embodiments, the POS transaction is processed via a financial transaction processing system, such as a credit card interchange or interbank network.

In various embodiments, the third party check-in transaction module 208 further includes a tracking module 230 configured to monitor third party check-ins and purchases from third party check-ins, a discount module 232 configured to apply POS discounts, and a notification module 234 configured to send or publish check-in and/or purchase notifications in accordance with user settings 216(1) . . . 216(N), each of which are further discussed herein.

FIG. 3A illustrates an example computing architecture for the mobile device 114 which enables the user 112 to conduct a POS transaction via a third party check-in at a particular merchant.

The mobile device 114 may be a mobile telephone, a smart phone, a personal digital assistant PDA, a tablet device, laptop computer, a media player, or any other mobile computing device that can connect to network(s) 110 at, or within a vicinity of, a particular merchant location to exchange check-in information with the third party systems 104(1) ... 104(N).

The mobile device 114 includes one or more processors 304 and computer readable media 306, each of which being similar as components previously discussed with respect to FIG. 2. Additionally, the mobile device includes at least one, but optionally multiple, third party mobile check-in applications 308(1) ... 308(N) (e.g., Facebook™, Twitter™, Foursquare™, etc.) that each have check-in functionality 310(1) ... 310(N). The mobile device 114 also includes other mobile data/applications 312 common to such mobile devices and that enable the mobile devices to perform typical everyday functions. The third party mobile check-in application may comprise a dedicated on-device application or a network page, such as a web page accessible via a browser of the mobile device 114.

FIG. 3B illustrates an example graphical user interface 302 for the mobile device 114 which enables the user 112 to conduct a POS transaction via a third party check-in at a particular merchant.

In various embodiments, the example graphical user interface (GUI) 302 for the mobile device 114 depicts graphical data displayed when a third party check-in function is being performed by user 112. The example GUI 302 corresponds to a user manually checking-in. For instance, the graphical user interface may display the particular third party mobile application selected for check-in 314, the merchant location where the user 112 and the mobile device 114 are currently located 316 (e.g., Joe's Coffee Shop), which contacts are being checked-in 318 (e.g., the owner of the device plus contacts Sam and Jim), whether or not payment services are set up with the cloud wallet system for this merchant 320, confirmation for the user third party check-in 322, and an option to view third party check-in payment settings for a particular merchant 324 as specified via the user settings 216(1) ... 216(N) in the user account 214(1) ... 214(N).

The elements of the GUI 302 are depicted to provide an example of information conveyed to the user 112 via the mobile device 114, and are in no way limiting to the disclosed subject matter. Rather, multiple different display and information configurations may be contemplated in light of the subject matter discussed herein. For example, when automatic user check-in occurs via GPS functionality that automatically locates the user 112 at a particular merchant, the GUI of the device may display an indication stating "You have been checked-in at Joe's Coffee Shop via 'The Third Party Mobile Application' and Cloud Wallet Service/Payment is Enabled." In various embodiments, the GUI 302 may be a customized GUI developed for a third party system 104(N).

Figure 4A:
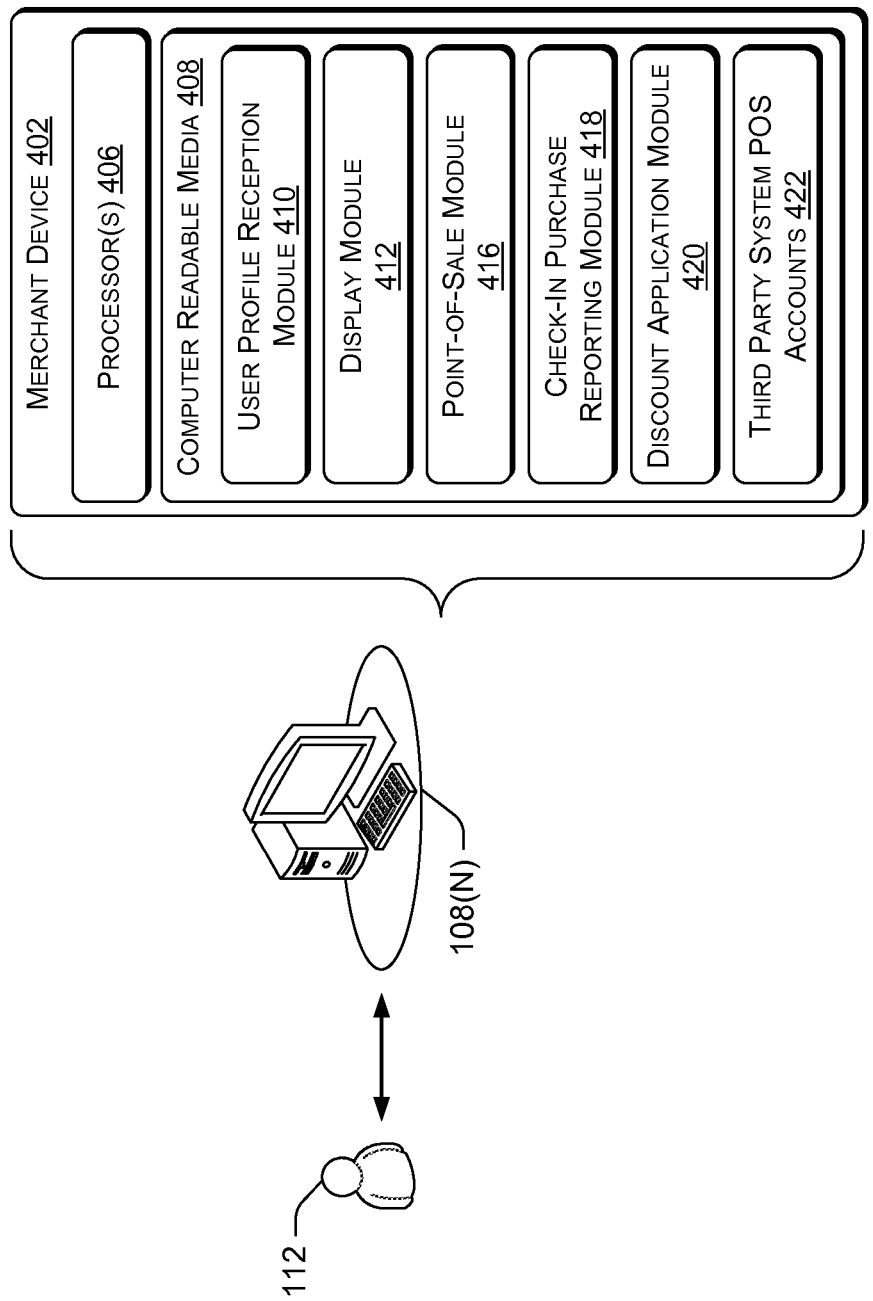
FIG. 4A is a block diagram of an example computing architecture of various components included in the point-of-sale merchant device of FIG. 1.
Figure 4B:
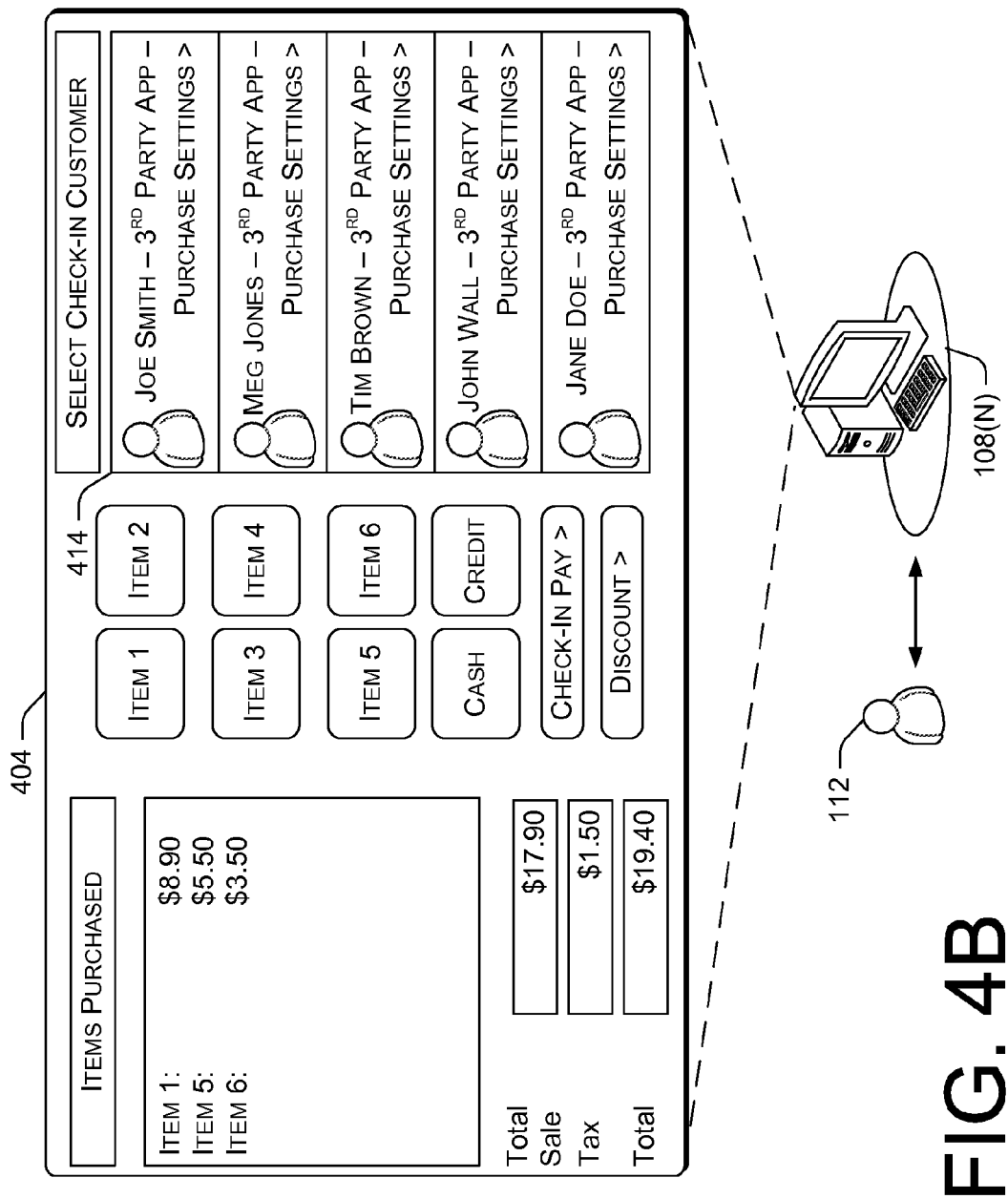
FIG. 4B is a block diagram of an example graphical user interface for the point-of-sale merchant device of FIG. 1.

FIG. 4A illustrates various components of an example merchant computing device 402 for a merchant system 108(N). FIG. 4B illustrates an example GUI 404 displayed to a representative (e.g., server, bartender, check-out clerk, barista, waitress, etc.) of the merchant.

The merchant computing device 402 may be a server computer, a personal computer, a laptop computer, a mobile device, or any other computing device that can conduct a POS transaction with a customer and connect to network(s) 110 to exchange check-in information with the third party systems 104(1) ... 104(N) so that the POS transaction can be successfully processed.

Moreover, the merchant computing device 402 comprises one or more processors 406 and computer readable media 408, each of which being similar as components previously discussed with respect to FIG. 2. In various embodiments, the computer readable media 408 of the merchant computing device 402 includes a user profile reception module 410 configure to receive customers' user profiles from the independent cloud wallet system 102 subsequent to individual users 112 checking-in at the merchant via one or more third party check-in applications. The computer readable media 408 further includes a display module 412 configured to cause a display of selective user profile information and additional information on a graphical user interface 404 when received, as depicted at 414. For example, the user profile information and the additional information may include i) a personal photo of each user registered with the cloud wallet system that is currently located at, or within the vicinity, of the merchant, ii) which third party application they used to check-in at the merchant, and iii) an option to view the third party check-in settings 216(1) ... 216(N) as further discussed herein.

In various embodiments, the computer readable media 408 may further include a point-of-sale module 416 configured to permit the merchant's representative to determine and enter items being purchased (e.g., clothing items) or items that have been consumed (e.g., food and drinks), select the "check-in pay" option once the items have been finalized and a total purchase price determined, and choose a user profile corresponding to the particular customer that wishes to complete the POS transaction. In this scenario, the merchant's representative can match the personal photo from the user profile with the face of the customer to ensure secure payment processing.

In various embodiments, the computer readable media 408 also includes a check-in purchasing reporting module 418 that is configured to convey data and details associated with the POS transaction to the cloud wallet system 102 so that the user account 214(N) can be debited and/or charged and funds (e.g., money) can be transferred to the merchant for the items delivered and/or the services rendered to the customer. In various embodiments, the cloud wallet system 102 transfers the funds to the merchant. In other embodiments, the cloud wallet system may cause a valid credit card for the user to be charged, and the credit card company may transfer the funds to the merchant.

In various embodiments, the computer readable media 408 also includes a discount application module 420 that is configured to apply a discount or a coupon to the POS transaction, as further discussed herein.

In various embodiments, the computer readable media 408 includes third party system POS accounts 422. The third party system POS accounts 422 may include identification information and/or application data unique to a particular third party system 104(N) so that a POS purchase can be processed following a user check-in. For example, a third party system POS account 422 may include a unique identification that is registered with the particular third party system 104(N) that links the merchant POS system to the third system 104(N) so that the user profiles of customers are distributed appropriately based on the check-in information. A registered connection between the merchant and the particular third party system 104(N) via a registered third party system POS account 422 helps provide a level of security for the user, ensuring that their user profiles are distributed to the correct merchant and not to fraudulent entities that pose as the merchant, etc.

Figure 5:
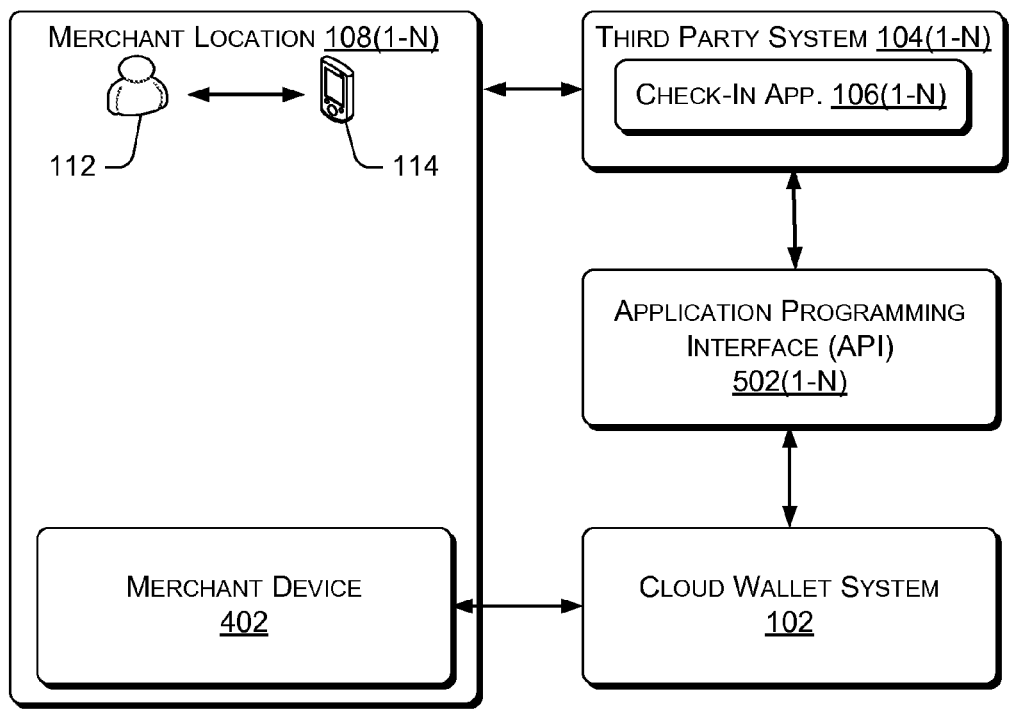
FIG. 5 is a block diagram of example Application Program Interfaces configured to interface the cloud wallet system with the third party systems in FIG. 1.

FIG. 5 illustrates an example flow of how third party user check-in information is accessed by the cloud wallet system 102 so that a POS transaction can be processed based on the overview provided in FIG. 1. In various embodiments, the independent cloud wallet system 102 implements an application programming interface (API) 502(1) . . . 502(N) for each third party system 104(1) . . . 104(N) so that check-in information can efficiently be accessed (e.g., via the "push" or "pull" processes previously discussed). An API is a specification intended to be used as an interface by software components to communicate with each other. An API may include specifications for routines, data structures, object classes, and variables. In particular, APIs 502(1) . . . 502(N) are configured to allow check-in information at the individual third party systems 104(1) . . . 104(N) to be communicated to, or accessed by, the cloud wallet system 102. Moreover, APIs 502(1) . . . 502(N) may also be configured to communicate POS transaction information from the cloud wallet system 102 to the individual third party systems 104(1) . . . 104(N) as further discussed herein.

FIG. 6 illustrates an example user account 214(N) maintained at the cloud wallet system 102. In various embodiments, the user account 214(N) includes basic personal information for a user, such as one or more account holder names 602 and contact information 604 (e.g., address, phone number, email), as well as payment information 606 so that a POS transaction can be processed. For example, the payment information 606 may include a stored value account with a balance of deposited funds, registered credit card information (e.g., type, number, expiration date, etc.) for the user, and/or registered bank account information (e.g., name of bank, account number, routing number, etc.), and/or gift cards registered with the cloud wallet system for one or more merchants (e.g., gift cards bought by the user, gift cards earned by the user and provided by the cloud wallet system, gift cards provided by the merchant, etc.). Further, user account 214(N) may also include one or more of the third party check-in applications 106(1) . . . 106(N) that are registered for use by the user 112. For example, the user 112 may prefer using a first check-in application and a second check-in application, and thus, may register both applications as third party check-in applications that can be used to conduct POS transactions via the payment information 606 at the cloud wallet system 102.

In various embodiments, the user account 214(N) may include a user profile 608. The user profile 608 includes information that is provided to the merchant 108(N) subsequent to a third party check-in. For example, the user profile 608 may include a profile photo 610 of the user 112 that typically includes a snapshot of the user's shoulders and face. The user profile 608 further includes one or more third party check-in purchase settings 216(N) which may selectively be communicated to the merchant 108(N) so the POS transaction can be conducted.

In various embodiments, the user 112 defines the third party check-in purchase settings 216(N) for the user account 214(N). The third party check-in purchase settings 216(N) may be universally applied settings which apply to all check-ins at all registered merchants at any time, or the third party check-in purchase settings 216(N) may be particular (or customized) settings which may be specifically defined for third party check-ins that occur at a particular merchant (e.g., a single merchant) or for multiple merchants within a particular merchant category (e.g., restaurants, recreational activities, bars, etc.). The third party check-in purchase settings 216(N) may provide different elements of security for third party check-in purchases, and thus, may impose restrictions on POS purchases. The third party check-in purchase settings 216(N) may also allow the user 112 to discipline self spending in advance. Moreover, these settings may work in conjunction with one another, or the settings may have priority associations if a conflict between two settings is realized.

In various embodiments, the third party check-in purchase settings 216(N) may include a setting that defines a time duration for POS purchases 612. For example, a time duration may specify that a POS purchase has to be conducted within a specified period of time subsequent to the third party check-in (e.g., ten minutes, thirty minutes, two hours, a day, and so forth). This specified period of time may correspond to all third party check-ins regardless of the merchant (e.g., a universally applied setting), or the user may specify separate time periods for individual merchants (e.g., a time period for a favorite clothes retailer, a time period for a restaurant, a time period for resort vacation concessions, etc.). In other embodiments, the user may define time periods according to merchant categories (e.g., restaurants/bars, clothes retailers, electronics retail stores, resort vacations, 'other' merchant category that fall outside any defined category, etc.). Defined time periods for different merchant categories may provide a benefit based on known user purchase habits. For example, a user often may not pay a restaurant or a bar tab within at least one hour of performing a third party check-in, while the user may often purchase a clothing item at a clothing retailer within thirty minutes.

In further embodiments, the time duration POS purchase setting 612 may block any POS purchases once the user 112 and the mobile device 114 have left the proximity of the merchant. This scenario may be realized via GPS functionality or a subsequent user check-in indicating a different location.

In various embodiments, the third party check-in purchase settings 216(N) may include a setting that defines a maximum amount for a single third party check-in purchase 614. For example, a user may define a maximum amount of $100 for all third party check-in purchases (e.g., a universally applied setting). In another example, a user may define, a maximum amount of $10 for third party check-in purchases at a favorite coffee shop (e.g., a particular merchant setting) or $10 for third party check-in purchases at any coffee shop (e.g., a particular merchant category setting). Of course, the maximum amounts set for particular merchants and/or particular merchant categories consider the type of items purchased and user purchase habits at the merchants. For example, a user would typically set a higher maximum amount for a clothes retailer merchant compared to a coffee shop merchant because one or more clothing items typically cost more than one or more coffee shop items.

In various embodiments, the third party check-in purchase settings 216(N) may include a setting that defines a maximum amount for third party check-in purchases for a time period 616. This setting deals with multiple third party check-in purchases. For example, the user may specify that he/she cannot spend more than $1000 per month via all third party check-in associations. In another example, the user may specify that $100 per week is the maximum amount to spend via all third party check-in associations. The user may set this amount in accordance with known spending habits. Similarly, this setting can be applied to a particular merchant or a particular merchant category too.

In various embodiments, the third party check-in purchase settings 216(N) may include a setting that defines whether other users (e.g., approved contacts, friends, followers, etc.) are permitted to check-in 618 a user via one of the registered third party applications so that a POS purchase can be performed. For example, an approved contact may check user 112 in at a particular merchant, and this check-in may be registered and published at the third party system even though user 112 did not use his own or her own mobile device 112 mobile device 114 to check-in. Accordingly, user 112 may specify that other user check-ins can, or cannot, be used to conduct a POS transaction via user account 214(N).

In various embodiments, the third party check-in purchase settings 216(N) may include a setting that defines day of the week restrictions 620. The user may define particular day of the week restrictions in accordance with user spending habits. For example, user 112 may define that on weekdays (i.e., M, T, W, Th, F), only $30 can be spent at all merchants, or a set of defined merchants or merchant categories (e.g., only coffee and food retailers). Yet, on the weekend days (i.e., Saturday and Sunday), user 112 may increase the amount to $100 and/or increase the set of allowed merchants and/or merchant categories based on the knowledge that the user is often visiting a wider variety of merchants, performing different activities, and spending more money because the user is not working. Of course, such restrictions can also be defined for weeks, months, years and so forth.

In various embodiments, the third party check-in purchase settings 216(N) may include a setting that stores and/or applies available merchant discounts or merchant coupons 622. For example, the user 112 may find or pre-clip a coupon for a particular merchant from an online session or from a periodical, and thus, the user 112 may register the coupon with user account 214(N) for future application to a POS transaction at the particular merchant. In another example, the particular merchant may provide a discount or a coupon to the cloud wallet system 102 based on a loyalty or rewards points program (i.e., the discount or coupon is unique to the user) or the particular merchant may provide a global sale or advertisement discount/coupon to all registered users at the cloud wallet system 102 in hope of targeting customers and increasing business. Here, the particular merchant benefits from the cloud wallet system 102 because the cloud wallet system 102 interfaces and is affiliated with multiple different third party systems 104(1) . . . 104(N), and thus, more potential customers can be targeted and reached out to. In yet another example, the discount or coupon for a particular merchant may be provided to the cloud wallet system 102 by one of the third party systems 104(1) . . . 104(N) via an agreement between the particular merchant and the third party system. In various embodiments, the discount or coupon may be applied at the POS, or may be saved and applied to a future third party check-in purchase at the particular merchant.

In various embodiments, the third party check-in purchase settings 216(N) may include a setting that defines whether a POS purchase by the user should be communicated to and published at the third party system 624 so the check-in will be shared with approved contacts, friends, followers, etc. For example, user 112 may wish to share all third party check-in purchases with his or her contacts, or a user may prefer to only share third party check-in purchases at particular merchants or check-in purchases within particular merchant categories, as previously discussed. In other embodiments, even though user 112 checked-in via a particular third party system 104(N), the POS purchase may be communicated and published at each of the third party systems 104(1) . . . 104(N) the user 112 uses so that the information can be shared with more people and more referrals may occur, as further discussed herein.

In various embodiments, the third party check-in purchase settings 216(N) may include a setting that defines notifications to be transmitted 626 upon processing a POS purchase via a third party check-in. For example, if a married couple has a joint account with two spouses named as the account holders 602, a notification may be sent to the account holder in the marriage who did not make the third party check-in purchase, indicating that their spouse just made a purchase for a certain amount at a particular merchant. In another example, a parent of a college student may receive a notification that the college student made a third party check-in purchase for a certain amount at a particular merchant.

In various embodiments, the user may indicate that one or more of the third party check-in purchase settings 216(N) can be overwritten or modified at the POS. For example, if the user sets that POS purchases via third party check-ins should be published to the third party 624 (e.g., at a personal message board or a streaming newsfeed), but he is buying a gift for a spouse who is also a contact via the third party system, then the user probably does not want to potentially share what was purchased. Therefore, the user may be able to overwrite the initial setting at the POS by indicating to the merchant that the POS purchase should not be published, and this modification can be communicated to the cloud wallet system 102 by the check-in purchase reporting module 418.

Illustrative Processes

The processes discussed herein are illustrated as a collection of blocks in a logical flow graph, which represent a sequence of operations that can be implemented in hardware, software, or a combination thereof. In some instances, the collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, modules, and the like that perform particular functions or implement particular abstract data types. The order in which the operations are described is not intended to be construed as a limitation, and any number of the described blocks can be combined in any order and/or in parallel to implement the processes.

Figure 7:
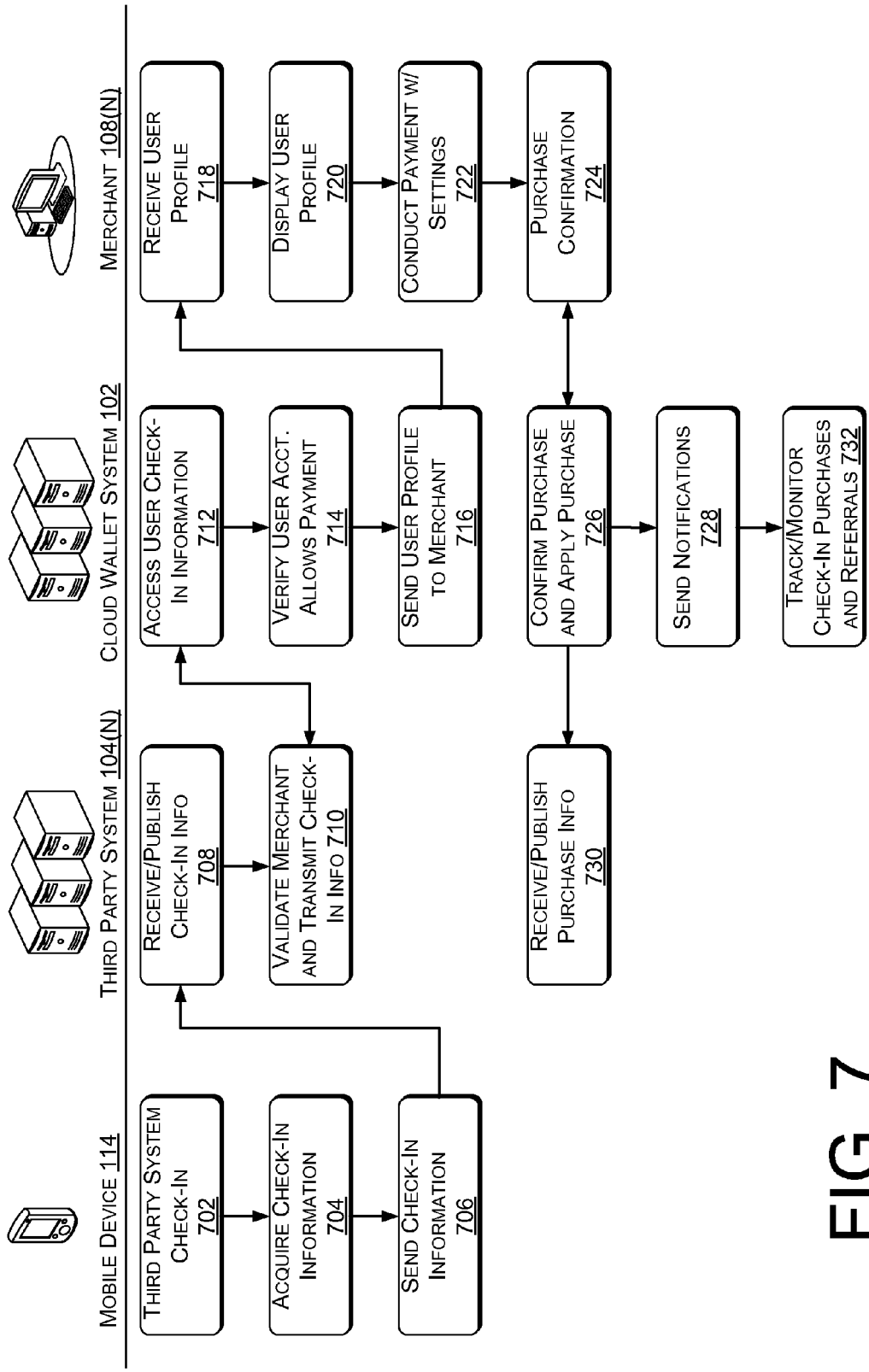
FIG. 7 is a flow diagram of an example process that uses check-in information to conduct point-of-sale transactions in accordance with the elements depicted in FIG. 1.

FIG. 7 depicts an example process that conducts a POS transaction using the user mobile device 114, a third party system 104(N), the independent cloud wallet system, and a merchant 108(N), as depicted in FIG. 1.

At 702, a third party check-in association is implemented at the user mobile device 114 in accordance with the discussion of FIG. 3. In various embodiments, the third party check-in may be an automatic check-in. An automatic check-in does not require any user input, but rather, the mobile device uses automatic locating functionality (e.g., GPS, etc.) to automatically determine a user location to communicate to the third party system. Alternatively, the third party check-in may be a manual check-in. In various embodiments, a manual check-in involves a user providing input at the mobile device 114 that initiates checking-in using the automatic locating functionality. In other embodiments, a manual check-in involves a user providing input at the mobile device 114 where the input indicates a desire to check-in yet also provides a physical location that is textually input by the user independent of any GPS functionality.

At 704, the mobile device 114 receives or acquires the check-in information to be communicated to the third party system. For example, the acquired check-in information may include one or more of the merchant name, the merchant address, a merchant identification, the date and time of day, any additional user contacts to check-in, uploaded images, user comments/captions, etc. As discussed above, some of the check-in information may be automatically determined using mobile device functionality and/or GPS functionality, while some of the check-in information may be provided by the user (e.g., images to upload, additional user contacts, user comments/captions).

At 706, the mobile device 114 sends the third party check-in information to the third party system 104(N) automatically or in response to user input.

At 708, the third party 104(N) receives the user check-in information. In various embodiments, the third party system 104(N) may publish the user check-in information in accordance with user third party settings. For example, the check-in may be published to a streaming feed or personal message board for the public to view, or for private network viewing.

At 710, the third party system 104(N) that receives the check-in information from the mobile device 114 of the user validates the merchant by determining that the merchant has a registered third party system POS account 422 and then transmits the user check-in information (e.g., user identification and merchant identification) to the cloud wallet system 102. In various embodiments, the third party system 104(N) may transmit user check-in information for all of its subscribers or members such that the check-in filtering module 224 at the cloud wallet system 102 has to filter the check-in information to determine what user check-ins correspond to users who have set up and registered a payment account at the cloud wallet system 102 (e.g., push all check-in information). In other embodiments, the third party system 104(N) may filter the user check-in information and only transmit check-in information for users who have set up and registered a payment account at the cloud wallet system 102 (e.g., push selective check-in information). In yet other embodiments, the check-in access module 222 at the cloud wallet system 102 may monitor all the user check-in information at the third party systems 104(1) . . . 104(N) in accordance with user third party system privacy settings and selectively pull user check-in information that corresponds to the users registered with the cloud wallet system 102.

At 712, the check-in access module 222 at the cloud wallet system 102 accesses and/or receives user third party check-in information for its registered users via the push or pull mechanisms previously discussed.

At 714, the check-in filtering module 224 at the cloud wallet system 102 verifies a user payment account associated with the user third party check-in. For example, the check-in filtering module 224 may verify that the user has a registered payment account with available funds (e.g., sufficient balance in stored value account) or up-to-date payment information (e.g., valid credit card) for conducting a POS transaction via a third party check-in. Additionally the check-in filtering module 224 may cross reference the accessed third party check-in information (e.g., merchant identification, time of day, etc.) with the third party check-in purchase settings 216(N) previously discussed with respect to FIG. 6 to verify, based on the available information, that the user is permitted to make a POS purchase via a third party check-in.

At 716, if a POS purchase via a third party check-in association is allowed, the user profile distribution module 226 at the cloud wallet system sends the user profile 608 and selective user account 214(N) information (e.g., account holder name) to the merchant 108(N). As previously discussed, the user profile 608 may include a snapshot photo of the user's face so that the merchant's representative is more likely to identify fraudulent behavior (e.g., when the photo does not match the face of the customer). In various embodiments, the user profile 608 may include a purchase history relationship between the merchant and the user (e.g., amount of money spent, frequency of visits, items commonly purchased), and/or a coupon or a discount to be applied to the POS transaction via the discounts/coupons setting 622. Alternatively, if a POS purchase via a third party check-in is not allowed, the user profile distribution module 226 does not send the user profile to the merchant and the user will not be able to perform a POS transaction using a third party check-in association.

At 718, the user profile reception module 410 at the merchant 108(N) receives the user profile from the user profile distribution module 226 at the cloud wallet system 102, and at 720, the display module 412 displays information from the user profile 608 via the GUI discussed with respect to FIG. 4.

At 722, the POS module 416 at the merchant 108(N) conducts the POS functionality for the transaction. For example, a merchant representative may conduct the POS transaction using the GUI 404 in FIG. 4B. Thus, the POS transaction may be conducted at a check-out device at a retail store. Alternatively, a bartender or waitress/waiter at a bar or restaurant may conduct the POS transaction by processing payment of a bill at a backroom server or computer device. In various embodiments, the discount application module 420 at the merchant 108(N) may apply a discount or coupon. The discount or coupon may have been received with the user profile 608, or alternatively, the discount or coupon may be determined at the merchant 108(N). For example, the merchant may determine this is the user's tenth visit, so the user gets a free coffee. Or the merchant may have a daily special for anyone that checks-in with the particular third party application.

At 724, the POS module 416 at the merchant 108(N) confirms the POS purchase via the third party check-in. In at least one embodiment, the POS module 416 confirms the POS purchase locally with the information provided in the user profile, which may already provide payment authorization. Then, the check-in purchase reporting module 418 will report the confirmed POS purchase to the cloud wallet system 102. In another embodiment, the check-in purchase reporting module 418 at the merchant 108(N) may communicate with the transaction processing module 228 at the cloud wallet system 102 and request payment authorization and process the POS transaction.

At 726, the transaction processing module 228 at the cloud wallet system 102 may confirm the POS purchase at the merchant and then cause the POS transaction to be processed (e.g., by applying the POS purchase amount to the user account 214(N)). For example, the transaction processing module 228 may charge or debit the total amount to a payment account (e.g., credit card, banking account, stored value account funds, etc.) which the user has set up with the cloud wallet system 102.

At 728, the notification module 234 at the cloud wallet system 102 may send out notifications of the POS purchase in accordance with the defined notifications settings 626 previously discussed. For example, a notification setting 626 may define that a personal message be sent to each joint account holder via electronic mail.

At 730, the third party system 104(N) may receive a communication indicating that a POS purchase occurred using the check-in application of the third party system, and the third party system may selectively publish information (e.g., select details) associated with the POS purchase so that the user's approved networks and/or groups can view the POS purchase. For example, the published check-in may include information pertaining to the merchant, the item purchased, the costs, any discounts or coupons applied to the purchase, any future purchase deals at the merchant 108(N) available to a potential viewer of the published information (e.g., a referral), or any combination thereof. In various embodiments, the purchase information to be published can be defined and authorized via the publish to third party setting 624. In other embodiments, the user 112 can provide input at the POS to authorize the selective information to be published.

At 732, the tracking module 230 at the cloud wallet system 102 may monitor and determine third party check-ins purchases and any referrals resulting from published POS purchases. For example, the cloud wallet system 102 may determine that User A purchased a pair of shoes at The Shoe Store and that the POS was published at third party system 104(N) via a third party check-in. The cloud wallet system 102 may subsequently determine that User B, a known approved contact of User A, also purchased the same pair of shoes at The Shoe Store some time later (e.g., thirty minutes, one hour, one day, one week, etc.). Based on this subsequent determination, the cloud wallet system 102 may infer that User B was referred to The Shoe Store by User A. Accordingly, the cloud wallet system 102 may have access to approved networks and/or groups for the user, e.g., so the tracking module 230 can infer a referral occurred via a third party system connection between User A and User B.

In various embodiments, the discount module 232 at the cloud wallet system 102, based on an agreement with the merchants 108(1) . . . 108(N), may determine a discount or coupon that the user has earned based on one or more of: a number of check-in purchases using a single third party check-in application, a number of check-in purchases using multiple different third party check-in applications associated with the cloud wallet system, a number of check-in purchases or an amount spent at a particular merchant, a number of check-in purchases or an amount spent at a group of merchants, a number of referrals. The discount module 232 may then store the discount or coupon in the discounts/coupons setting 622.

Figure 8:
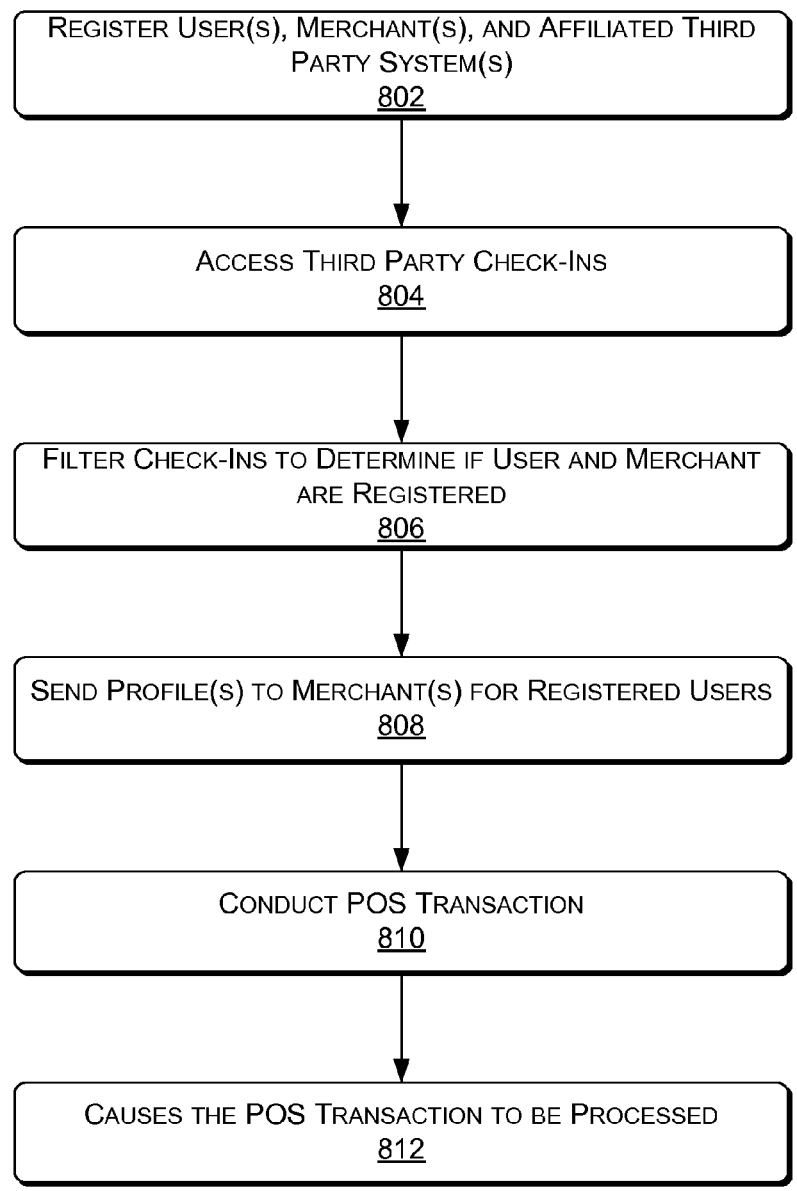
FIG. 8 is a flow diagram of an example process that uses check-in information to conduct point-of-sale transactions in accordance with the techniques discussed herein.

FIG. 8 is a flow diagram of an illustrative process 800 that occurs at the cloud wallet system 102 and/or the merchant 108(N) so that a POS purchase via a third party check-in can be processed.

At 802, the registration module 212 at the cloud wallet system registers users, merchants, and affiliated third party systems. For example, users who want to realize the convenience of using any third party check-in application may provide the information discussed with respect to the user account 214(N) in FIG. 6 when registering. Merchants who want to expand their customer base and reach out to the users registered with the cloud wallet system 102, will also register with the cloud wallet system and/or the third party systems to process POS transactions via third party check-ins as discussed with respect to FIG. 4. Third party systems that do not have the resources to develop and configure a dedicated electronic wallet service will also affiliate their check-in functionality with the independent cloud wallet system 102 to provide additional and valuable services to their users (e.g., contacts, members, subscribers, etc.).

At 804, the check-in access module 222 accesses third party check-in information for each of the affiliated third party systems 104(1) . . . 104(N). This operation may be similar to operation(s) 710 and/or 712 in FIG. 7.

At 806, the check-in filtering module 224 filters the accessed third party check-in information so that appropriate check-ins can be used to conduct POS purchases. For example, the check-in filtering module 224 may determine that both a user and a merchant associated with a single third party check-in are registered with the cloud wallet system 102 so that the POS purchase at the merchant can be conducted using the cloud wallet system 102. This operation may be similar to operation 714 in FIG. 7.

At 808, the user profile distribution module 226 sends the user profiles to the corresponding merchants for the registered users that have checked-in so that the profile photos 610 and any third party check-in purchase settings 216(N) can be displayed at the merchant. This operation may be similar to operation(s) 716 and/or 718 in FIG. 7.

At 810, the transaction processing module 228 at the cloud wallet system 102 and/or the POS module 416 at the merchant conduct the POS transaction in accordance with the third party check-in purchase settings 216(N) in the user profile. Of course, if the POS transaction violates one or more of the third party check-in purchase settings 216(N) in the user profile, then the merchant may kindly inform the customer that payment via the third party check-in is not possible and another payment process will have to be used. This operation may be similar to operation(s) 722, 724 and/or 726 in FIG. 7.

At 812, the transaction processing module 228 at the cloud wallet system 102 causes the POS transaction to be processed. For example, when payment account information 606 includes a valid credit card, the transaction processing module 228 will charge the credit card for the total amount of the POS transaction. Of course, the credit card may have associated credit limits and/or authorization requirements. In another example, the transaction processing module 228 may debit a registered bank account or a stored value account with available funds. Similar to the transaction processing with a credit card, the registered bank account and the stored value account may have maximum transaction amounts and authorization requirements. In various embodiments, the cloud wallet system 102 may transfer available funds directly to the merchant for the items and/or services delivered to the user or consumed by the user.

Figure 9:
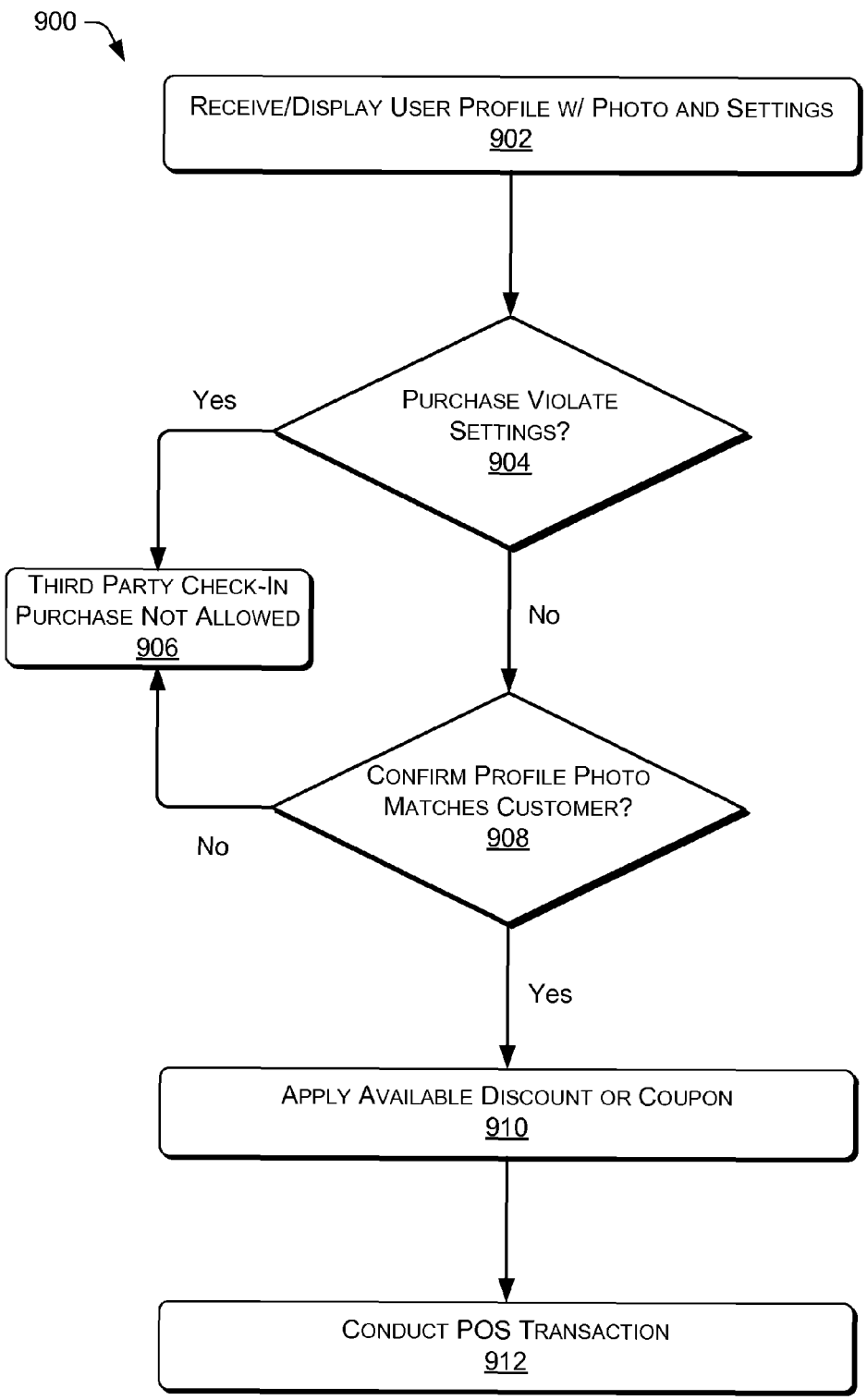
FIG. 9 is a flow diagram of an example process that conducts a point-of-sale transactions based on purchase settings in accordance with the techniques discussed herein.

FIG. 9 is a flow diagram of an illustrative process 900 that further details the processing of the POS transaction 810 with respect to what occurs at the merchant 108(N).

At 902, the user profile reception module 410 receives the user profile 608 with a profile photo 610 and third party check-in purchase settings 216(N) and the display module 412 causes the profile photo to be displayed and optionally one or more of the settings 216(N).

In various embodiments, at 904, the POS module 416 determines the POS purchase information (e.g., items purchased, total cost, time of purchase, date, etc.) and cross-references the information with the third party check-in purchase settings 216(N) to determine whether or not any settings are violated. For example, the time duration for a purchase setting 612 may be violated if the customer is trying to purchase an item beyond the allotted time for a purchase since the third party check-in. In another example, the maximum amount for a single check-in setting 614 may be violated if the customer is purchasing items totaling $100 when the maximum amount for a single check-in purchase is $50. In yet another example, the day of the week restrictions setting 620 may be violated if the customer is trying to purchase a new television at an electronic store on a Wednesday when only food and/or drink check-in purchases are allowed during weekdays. In other embodiments, the POS module 416 may communicate with the transaction processing module 228 at the cloud wallet system 102 to determine whether or not any third party check-in purchases settings 216(N) are violated. If any third party check-in purchases settings 216(N) are violated, then the POS purchase via the third party check-in is not allowed 906 (following the "no" route from the decision operation 904).

If the third party check-in purchases settings 216(N) are not violated (following the "yes" route from the decision operation 904), then at 908 the POS module 416 at the merchant seeks confirmation from a merchant representative that the profile photo 414 displayed on the GUI 404 in FIG. 4 matches the face of the customer located at the merchant (or the identity of the customer is otherwise verified). If there is suspicion that there is no match, the representative at the merchant may not confirm the POS transaction and thus, it will not be allowed 906 (following the "no" route from the decision operation 908).

When confirmation that the profile photo matches the face of the customer is received or the identity of the customer is otherwise verified (following the "yes" route from the decision operation 908), then at 910 the discount application module 410 may optionally apply an available discount or coupon that either was included in the user profile, or may be available for use at the merchant location.

At 912, the POS transaction via the third party check-in can be processed by the POS module 416 and/or the transaction processing module 228.

Figure 10:
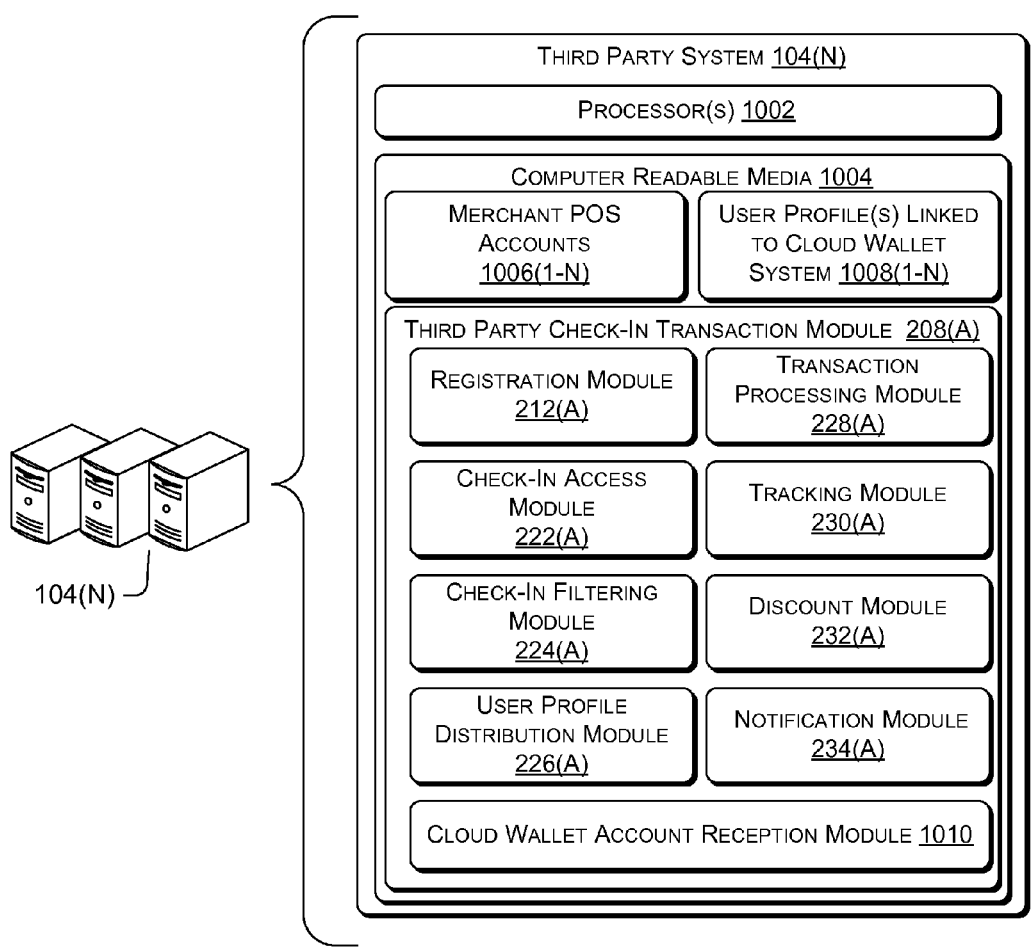
FIG. 10 is a block diagram of an example computing architecture of various components included in an example third party system of FIG. 1.

FIG. 10 illustrates information and/or computer-executable instructions maintained at the third party system 104(N), in accordance with various embodiments. The third party system 104(N) includes one or more devices (e.g., servers) that include processor(s) 1002 and computer readable media 1004, each of which has been previously discussed. Moreover, the third party system 104(N) may include merchant POS accounts 1006(1) . . . 1006(N) that have been registered, in advance, with the third party system 104(N) by the registration module 212(A). In various embodiments, a merchant POS account 1006(N) at the third party system 104(N) may be linked with a third party system POS account 422 at the merchant, so that merchant validation can occur and POS purchases using third party check-in information can be processed, as previously discussed.

In various embodiments, the third party system 104(N) may include a set of user profiles linked to the cloud wallet system 1008(1) . . . 1008(N). For example, a user of the third party system 104(N) may configure or set-up his/her third party user account (e.g., membership, subscription) so that it is linked to the cloud wallet system 102.

In various embodiments, the third party system 104(N) may include a third party check-in transaction module 208(A). The third party check-in transaction module 208(A) includes similar modules discussed in FIG. 2 (e.g., a registration module 212(A), a check-in access module 222(A), a check-in filtering module 224(A), a user profile distribution module 226(A), a transaction processing module 228(A), a tracking module 230(A), a discount module 232(A), and a notification module 234(A)), but are located on the third party system 104(N) so the third party system 104(N) can provide check-in transaction processing services. Accordingly, these modules are labeled with an "A" since they may perform similar functionality and communications as their counterparts in FIG. 2. In some embodiments the modules depicted in third party check-in transaction module 208(A) may work in conjunction with their counterparts on the cloud wallet system depicted in FIG. 2. Moreover, the third party check-in transaction module 208(A) may further include a cloud wallet account reception module 1010. The modules depicted in the third party check-in transaction module 208(A) at the third party system 104(N) are further discussed herein with respect to FIG. 12.

Figure 11:
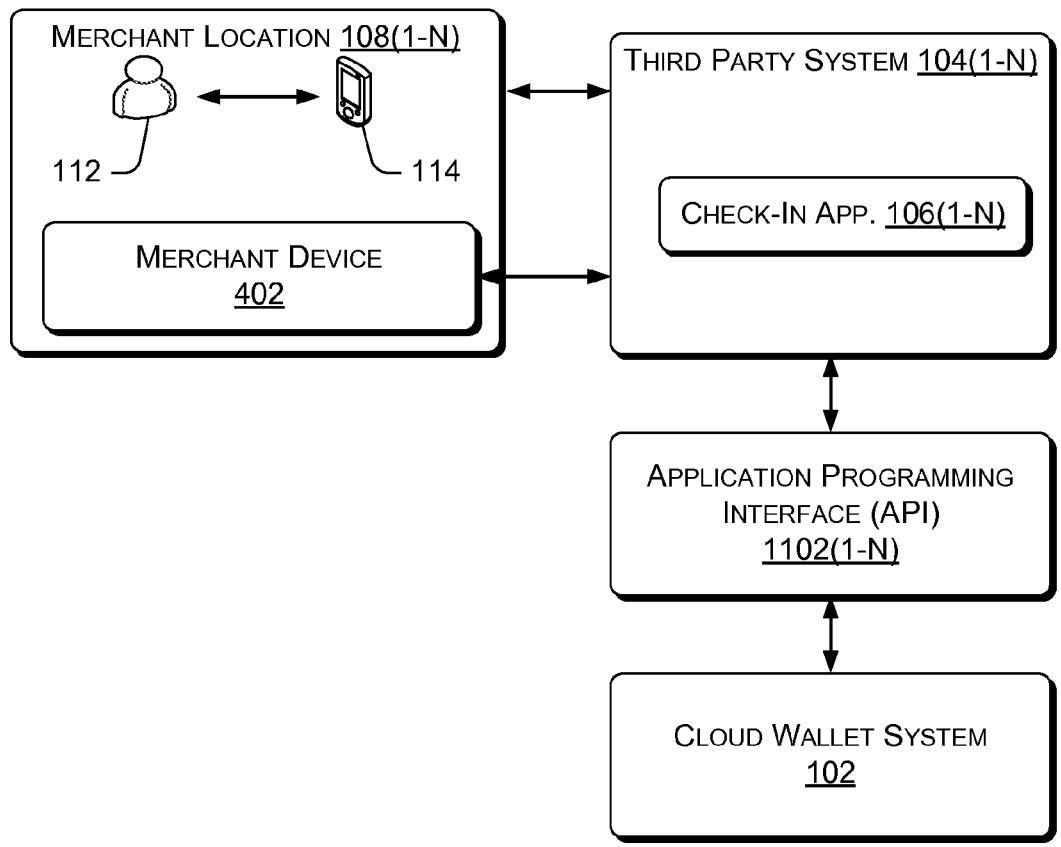
FIG. 11 is a block diagram of additional example Application Program Interfaces configured to interface the cloud wallet system with the third party systems in FIG. 1.

FIG. 11 illustrates an example flow of how third party user check-in information is accessed by the third party system 104(N) so that a POS transaction can be processed at the third party system 104(N). In various embodiments, the independent cloud wallet system 102 implements APIs 1102(1) . . . 1102(N) for each third party system 104(1) . . . 104(N) so that cloud wallet account information (e.g., payment information 606, profile photo 608, and/or the third party check-in purchase settings 216(N)) for the user can be provided. An example difference between FIG. 5 and FIG. 11 is that the merchant device 402 and the third party system 104(N) communicate with each other in FIG. 11 to process the POS purchase based on the user check-in.

Figure 12:
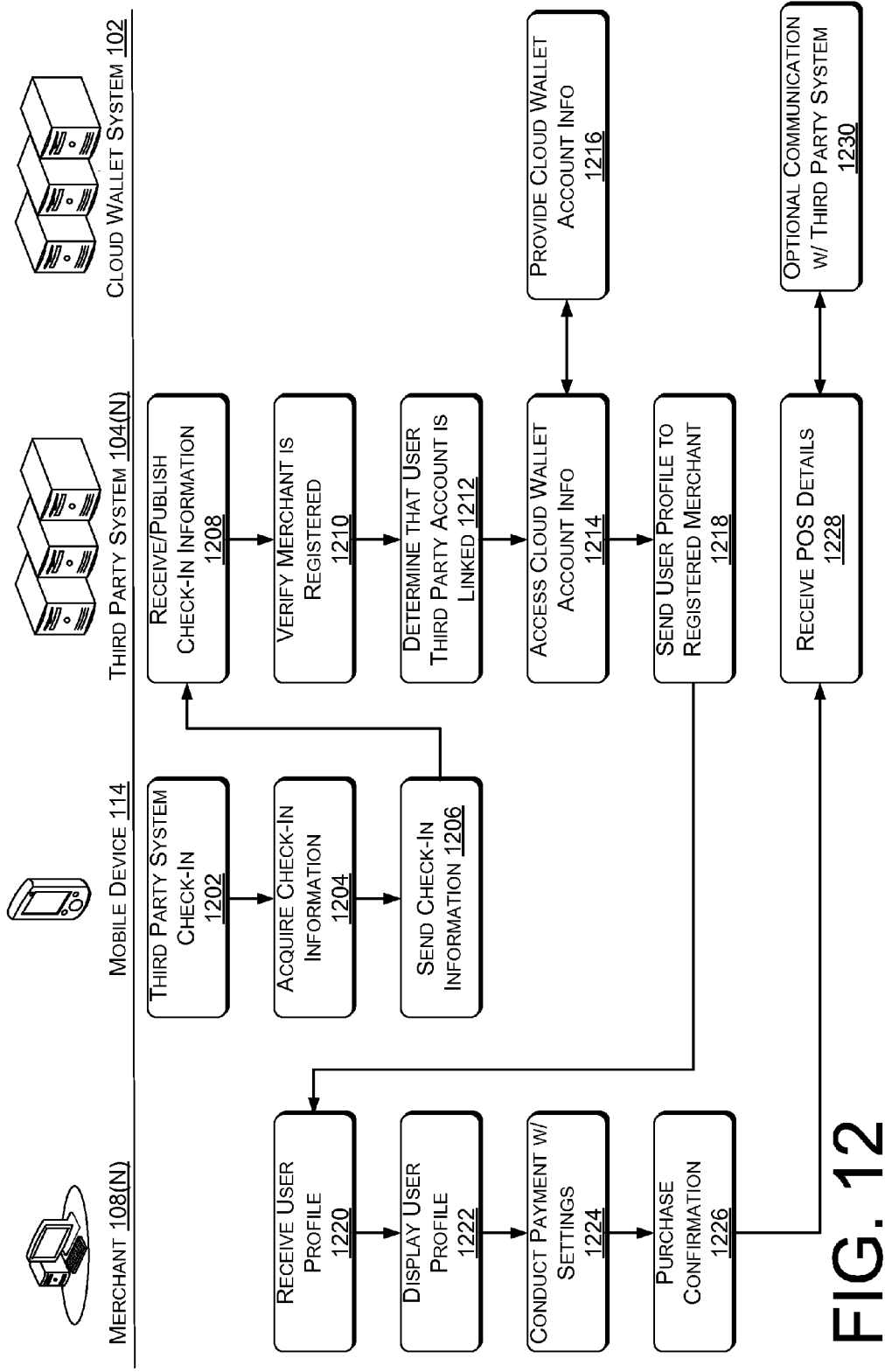
FIG. 12 is a flow diagram of an additional example process that uses check-in information to conduct point-of-sale transactions in accordance with the elements depicted in FIG. 1.

FIG. 12 depicts an example process that conducts a POS transaction using the user mobile device 114, a third party system 104(N), the independent cloud wallet system 102, and a merchant 108(N), as depicted in FIG. 1. The example process in FIG. 12 is an alternative process to the example process described with respect to FIG. 7.

At 1202, a third party check-in association is implemented at the user mobile device 114 in accordance with the discussion of FIG. 3. This operation is similar to operation 702 in FIG. 7. At 1204, the mobile device 114 acquires the check-in information to be communicated to the third party system. This operation is similar to operation 704 in FIG. 7. At 1206, the mobile device 114 sends the third party check-in information to the third party system 104(N) automatically or in response to user input. This operation is similar to operation 706 in FIG. 7. At 1208, the check-in access module 222(A) at the third party system 104(N) receives the user check-in information and may publish the user check-in information in accordance with user third party settings. This operation is similar to operation 708 in FIG. 7.

At 1210, the check-in filtering module 224(A) at the third party system 104(N) verifies that the merchant has a registered merchant POS account 1006(N) with a merchant identification. At 1212, the check-in filtering module 224(A) at the third party system 104(N) determines whether the user associated with the check-in information has a third party user account (e.g., 1008(N)) linked to the cloud wallet system 102.

If the check-in filtering module 224(A) at the third party system 104(N) verifies that the merchant has a registered merchant POS account and determines that the user associated with the check-in information has a third party user account linked to the cloud wallet system 102, then at 1214, the cloud wallet account reception module 1010 accesses cloud wallet account information for the user stored at the cloud wallet system 102. For example, cloud wallet account reception module 1010 may indicate to the cloud wallet system 102 that user A has checked-in at registered merchant B. Cloud wallet system 102 can optionally further validate that user A and merchant B are registered to conduct POS transactions via third party system check-ins and then the cloud wallet system 102 can provide cloud wallet account information for the user at 1216 (e.g., payment information 606, user profile 608, profile photo 610, and/or the third party check-in purchase settings 216(N)).

At 1218, the user profile distribution module 226(A) at the third party system 104(N) sends the user profile and other selective information received from the cloud wallet system to the registered merchant where the user is located as indicated by the check-in.

At 1220, the user profile reception module 410 at the merchant 108(N) receives the user profile from the user profile distribution module 226(A) at the third party system 104(N), and at 1222, the display module 412 displays information from the user profile 608 via the GUI discussed with respect to FIG. 4.

At 1224, the POS module 416 at the merchant 108(N) conducts the POS functionality for the transaction. As previously discussed, processing the POS transaction is conducted in accordance with the third party check-in purchase settings 216(N) and may include an authorization process, and/or the application of a discount/coupon. At 1226, the POS module 416 at the merchant 108(N) confirms the POS purchase via the third party check-in, and the check-in purchase reporting module 418 will report the confirmed POS purchase to the third party system 104(N).

At 1228, the transaction processing module 228(A) at the third party system 104(N) may receive POS details from the merchant. Moreover, the third party system 104(N) may further perform functionality associated with: i) the tracking of POS purchases for particular users or particular merchants (e.g., performed by the tracking module 230(A)), ii) the subsequent determination of a discount based on tracked POS purchases or referral information (e.g., performed by the discount module 232(A)), and/or iii) the subsequent sending of notifications (e.g., performed by the notification module 234(A)).

In various embodiments, at 1230, further communication between the third party check-in transaction module 208(A) at the third party system 104(N) and the cloud wallet system 102 may occur to process the POS of transaction. For example, the third party check-in transaction module 208(A) and the cloud wallet system 102 may further communicate to fulfill payment or transfer funds. In another example, the third party check-in transaction module 208(A) and the cloud wallet system 102 may further apply a coupon or a gift card to the POS transaction.

Furthermore, in some embodiments the third party check-in transaction module 208(A) may post and/or publish the details of the user check-in and the POS purchase (or at least a portion of the details) to a newsfeed or a personal message board (e.g., private or public) associated with a user account. In this scenario, contacts of the user (e.g., networks of friends, colleagues, family members, approved contacts) may view the details of the POS purchase based on the user check-in.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method for secure transaction at a point of sale (POS) system, the computer-implemented method comprising:
   under control of one or more servers configured with executable instructions,
   receiving, by a cloud wallet system, a first user check-in from a third party social network system, the first user check-in locating a first user device of a first user at a first merchant, the cloud wallet system being a centralized network based entity that maintains user payment information and processes transactions between merchant accounts and users, wherein the first merchant is of a first category;
   receiving, by the cloud wallet system, a second user check-in at the third party social network system, the second user check-in locating a second user device of a second user at a second merchant, the second merchant is of a second category that is different from the first category,
      wherein the third party social network system (i) is different from the cloud wallet system, (ii) is in communication with the cloud wallet system over a communications network, and (iii) provides social network services to a plurality of users;
   receiving a request for a transaction amount, at the cloud wallet system, from a first merchant device of the first merchant during or after a first point-of-sale (POS) transaction with the first user, the first POS transaction including a purchase of one or more items or one or more services by the first user from the first merchant for the transaction amount, whereby the first user does not need to present any payment instrument to the POS system of the merchant, thereby increasing security associated with handling payment instruments;
   permitting, by the cloud wallet system, the first POS transaction to be conducted between the first merchant and the first user based on the first POS transaction being conducted within a first amount of time subsequent to receiving, by the cloud wallet system, the first user check-in, the first amount of time based on the first category of the first merchant and stored user purchase habits with the first category of the first merchant;
   permitting, by the cloud wallet system, a second POS transaction to be conducted between the second merchant and the second user based on the second POS transaction being conducted within a second amount of time subsequent to receiving, by the cloud wallet system, the second user check-in, the second amount of time based on the second category of the second merchant and stored user purchase habits with the second category of the second merchant, and the second amount of time being different from the first amount of time based on the first category being different from the second category; and
   causing the transaction amount to be transferred from a payment account of the first user at the cloud wallet system to a payment account of the first merchant.

2. The method as recited in claim 1, wherein the cloud wallet system accesses the first user check-in at the third party social network system via an application programming interface (API) configured between the cloud wallet system and the third party social network system, wherein the API is configured to:
   facilitate pushing the first user check-in from the third party social network system to the cloud wallet system; or
   facilitate pulling the first user check-in from the third party social network system to the cloud wallet system.

3. The method as recited in claim 1, further comprising:
   tracking a number of purchases via the first user check-in at the merchant; and determining a discount or coupon to be applied to a next purchase via a next user check-in at the merchant.

4. The method as recited in claim 1, further comprising:
generating a confirmation of the first POS transaction between the first user and the first merchant; and
transmitting, by the cloud wallet system, information associated with the first POS transaction between the first user and the first merchant to the third party social network system to enable the third party social network system to publish at least a part of the information for viewing by one or more contacts associated with the first user.

5. A system comprising:
one or more processors;
one or more memories coupled to the one or more processors;
a registration module, stored in the one or more memories and executable by the one or more processors, that registers one or more users and one or more merchants with the system, wherein the one or more users includes a first user, and wherein the one or more merchants includes (i) a first merchant that is of a first category and (ii) a second merchant that is of a second category;
a check-in access module, stored in the one or more memories and executable by the one or more processors, that accesses check-in information at one or more third party systems for the one or more users;
a user profile distribution module, stored in the one or more memories and executable by the one or more processors, that distributes profiles to the one or more merchants based at least in part on the accessed check-in information; and
a transaction processing module, stored in the one or more memories and executable by the one or more processors, that processes one or more point-of-sale (POS) transactions at the one or more merchants based at least in part on the distributed profiles,
wherein the transaction processing module processes a first POS transaction between the first user and the first merchant if the first POS transaction is conducted within a first amount of time from the check-in access module accessing check-in information for the first user at the first merchant, the first amount of time based on the first category of the first merchant and stored user purchase habits with the first category of the first merchant,
wherein the transaction processing module processes a second POS transaction between the first user and the second merchant if the second POS transaction is conducted within a second amount of time from the check-in access module accessing check-in information for the first user at the second merchant, the second amount of time based on the second category of the second merchant and stored user purchase habits with the second category of the second merchant, and
wherein the first time period is different from the second time period based on the first category of the first merchant being different from the second category of the second merchant.

6. The system of claim 5, further comprising a data store that maintains one or more purchase settings for each of the one or more users, the one or more purchase settings restricting the POS transactions conducted by the one or more users at the one or more merchants.

7. The system of claim 5, further comprising a tracking module, stored in the one or more memories and executable by the one or more processors, that tracks a number of user check-ins at the one or more merchants.

8. The system of claim 7, further comprising a discount module, stored in the one or more memories and executable by the one or more processors, that determines a future discount to be applied to a future purchase at a particular merchant based at least in part on the number of user check-ins.

9. A system comprising:
one or more processors;
one or more memories coupled to the one or more processors, the one or more memories comprising computer executable instructions that, when executed on the one or more processors, performs operations comprising:
receiving, by a cloud wallet system, a first user check-in from a third party social network system, the first user check-in locating a first user device of a first user at a first merchant, the cloud wallet system being a centralized network based entity that maintains user payment information and processes transactions between merchant accounts and users, wherein the first merchant is of a first category;
receiving, by the cloud wallet system, a second user check-in at the third party social network system, the second user check-in locating a second user device of a second user at a second merchant, the second merchant is of a second category that is different from the first category,
wherein the third party social network system (i) is different from the cloud wallet system, (ii) is in communication with the cloud wallet system over a communications network, and (iii) provides social network services to a plurality of users;
receiving a request for a transaction amount, at the cloud wallet system, from a first merchant device of the first merchant during or after a first point-of-sale (POS) transaction with the first user, the first POS transaction including a purchase of one or more items or one or more services by the first user from the first merchant for the transaction amount, whereby the first user does not need to present any payment instrument to the POS system of the merchant, thereby increasing security associated with handling payment instruments;
permitting, by the cloud wallet system, the first POS transaction to be conducted between the first merchant and the first user based on the first POS transaction being conducted within a first amount of time subsequent to receiving, by the cloud wallet system, the first user check-in, the first amount of time based on the first category of the first merchant and stored user purchase habits with the first category of the first merchant;
permitting, by the cloud wallet system, a second POS transaction to be conducted between the second merchant and the second user based on the second POS transaction being conducted within a second amount of time subsequent to receiving, by the cloud wallet system, the second user check-in, the second amount of time based on the second category of the second merchant and stored user purchase habits with the second category of the second merchant, and the second amount of time being different from the first amount of time based on the first category being different from the second category; and causing the transaction amount to be transferred from a payment account of the first user at the cloud wallet system to a payment account of the first merchant.

10. The system of claim 5, wherein the cloud wallet system accesses the first user check-in at the third party social network system via an application programming interface (API) configured between the cloud wallet system and the third party social network system, wherein the API is configured to:
  facilitate pushing the first user check-in from the third party social network system to the cloud wallet system; or
  facilitate pulling the first user check-in from the third party social network system to the cloud wallet system.

11. The system of claim 5, further comprising:
  tracking a number of purchases via the first user check-in at the merchant; and
  determining a discount or coupon to be applied to a next purchase via a next user check-in at the merchant.

12. The system of claim 5, further comprising:
  generating a confirmation of the first POS transaction between the first user and the first merchant; and
  transmitting, by the cloud wallet system, information associated with the first POS transaction between the first user and the first merchant to the third party social network system to enable the third party social network system to publish at least a part of the information for viewing by one or more contacts associated with the first user.

13. A computer-implemented method comprising:
  under control of one or more servers configured with executable instructions,
    registering one or more users and one or more merchants with a cloud wallet system, wherein the one or more users includes a first user, and wherein the one or more merchants includes (i) a first merchant that is of a first category and (ii) a second merchant that is of a second category;
    accessing check-in information at one or more third party systems for the one or more users;
    distributing profiles to the one or more merchants based at least in part on the accessed check-in information; and
    processing one or more point-of-sale (POS) transactions at the one or more merchants based at least in part on the distributed profiles,
    processing a first POS transaction between the first user and the first merchant if the first POS transaction is conducted within a first amount of time from accessing check-in information for the first user at the first merchant, the first amount of time based on the first category of the first merchant and stored user purchase habits with the first category of the first merchant,
    processing a second POS transaction between the first user and the second merchant if the second POS transaction is conducted within a second amount of time from accessing check-in information for the first user at the second merchant, the second amount of time based on the second category of the second merchant and stored user purchase habits with the second category of the second merchant, and
    wherein the first time period is different from the second time period based on the first category of the first merchant being different from the second category of the second merchant.

14. The method as recited in claim 13, further comprising maintaining one or more purchase settings for each of the one or more users, the one or more purchase settings restricting the POS transactions conducted by the one or more users at the one or more merchants.

15. The method as recited in claim 13, further comprising tracking a number of user check-ins at the one or more merchants.

16. The method as recited in claim 15, further comprising determining a future discount to be applied to a future purchase at a particular merchant based at least in part on the number of user check-ins.

* * * * *